United States Patent
Hasan et al.

(10) Patent No.: US 8,867,181 B2
(45) Date of Patent: Oct. 21, 2014

(54) PROTECTION OF MOTOR DRIVE SYSTEMS FROM CURRENT SENSOR FAULTS

(75) Inventors: S. M. Nayeem Hasan, Novi, MI (US); Steven E. Schulz, Torrance, CA (US); David P. Tasky, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 13/244,052

(22) Filed: Sep. 23, 2011

(65) Prior Publication Data

US 2013/0077194 A1 Mar. 28, 2013

(51) Int. Cl.
| | |
|---|---|
| *H02H 5/04* | (2006.01) |
| *H02H 3/00* | (2006.01) |
| *G01R 31/34* | (2006.01) |
| *H02P 21/00* | (2006.01) |
| *H02H 7/00* | (2006.01) |
| *H02P 29/02* | (2006.01) |

(52) U.S. Cl.
CPC .......... *H02P 29/022* (2013.01); *H02P 21/0035* (2013.01); *H02H 7/00* (2013.01); *H02P 29/023* (2013.01)
USPC .............. 361/31; 361/23; 361/87; 324/765.01

(58) Field of Classification Search
USPC ............................. 361/23, 31, 87; 324/765.01
See application file for complete search history.

(56) References Cited

U.S. PATENT DOCUMENTS

| | | | | |
|---|---|---|---|---|
| 6,525,504 | B1 * | 2/2003 | Nygren et al. ................ | 318/700 |
| 6,525,543 | B1 | 2/2003 | Roberts et al. | |
| 6,967,454 | B1 * | 11/2005 | Braun ........................... | 318/565 |
| 7,145,268 | B2 * | 12/2006 | Edwards et al. .............. | 307/127 |
| 7,459,874 | B2 | 12/2008 | Bae et al. | |
| 2002/0008492 | A1 | 1/2002 | Nagayama | |
| 2003/0197989 | A1 * | 10/2003 | Nojima ........................... | 361/47 |
| 2004/0125523 | A1 * | 7/2004 | Edwards et al. ................ | 361/88 |
| 2010/0320953 | A1 | 12/2010 | Yeh et al. | |

FOREIGN PATENT DOCUMENTS

| | | |
|---|---|---|
| CN | 101025434 A | 8/2007 |
| CN | 101567661 A | 10/2009 |
| CN | 101850723 A | 10/2010 |
| CN | 102045024 A | 5/2011 |
| JP | 2005039964 A | 2/2005 |

OTHER PUBLICATIONS

German Patent and Trade Mark Office, Office Action in German Patent Application No. 10 2012 215 571.6, mailed Sep. 13, 2013.

(Continued)

*Primary Examiner* — Eduardo Colon Santana
*Assistant Examiner* — Gabriel Agared
(74) *Attorney, Agent, or Firm* — Ingrassia Fisher & Lorenz, P.C.

(57) ABSTRACT

Methods and apparatus are provided for detecting a phase current sensor fault in a multi-phase electrical motor. The method comprises, receiving an input torque command T* and measuring a set of feedback signals of the motor including a phase current Ix for each of the phases of the motor, generating direct and quadrature command phase currents Id*, Iq* for the motor corresponding to a value of the input torque command T*, determining a total command current Is=[(Iq*)2+(Id*)2]½, generating a negative sequence current Ineg, where for three phases Ineg=(⅓)[Ia+(α2)Ib+(α)Ic], where α=ej2π/3, combining Ineg and Is to provide a normalized negative sequence current Inn=Ineg/Is, comparing the normalized negative sequence current Inn to a predetermined threshold value INN* to determine the presence of a phase current sensor fault, and executing a control action when Inn>INN*.

14 Claims, 3 Drawing Sheets

(56) References Cited

OTHER PUBLICATIONS

State Intellectual Property Office of the Peoples' Republic of China, Office Action for Chinese Patent Application No. 201210353821.4, mailed Jun. 30, 2014.

* cited by examiner

PROTECTION OF MOTOR DRIVE SYSTEMS FROM CURRENT SENSOR FAULTS

TECHNICAL FIELD

The present invention generally relates to fault protection in electric motor drive systems, and more particularly relates to the identification of motor phase current sensor faults and remedial action to forestall or mitigate damage to the motor drive system and its components.

BACKGROUND

Alternating current (AC) electric motor systems powered from direct current (DC) energy sources are widely used today. Electrical motor propulsion systems for vehicles where the DC energy source is a battery are well known. Stationary DC to AC motor propulsion systems are also widely used. The control systems used within such propulsion systems monitor and control the current flowing to each phase of the polyphase motor. The current sensors used in such systems are not always as accurate as desired or their accuracy may change with time as the system ages. Prior art motor control systems have not been able to distinguish between normal operating errors and errors caused by current sensor faults. When sensor errors or faults go undetected, the system controller and/or the propulsion motor itself may be damaged and system users may be exposed to hazards.

Accordingly, it is desirable to provide an improved control system and method for detecting phase current sensor errors due to sensor fault and, where appropriate, taking remedial action. In addition, it is desirable that the apparatus and method for detecting such sensor errors and taking remedial action be simple, rugged and reliable and be adapted to being retrofitted to existing systems. Furthermore, other desirable features and characteristics of the present invention will become apparent from the subsequent detailed description and the appended claims, taken in conjunction with the accompanying drawings and the foregoing technical field and background.

BRIEF SUMMARY

Method and apparatus are provided for detecting a phase current sensor (38) fault in a multi-phase electrical motor (26) and taking appropriate action. An input torque command T* (43) and set of feedback signals (60) of the motor (26) including a phase current Ix for each of the phases of the motor (26) are received or measured, direct and quadrature command phase currents $Id^*$, $Iq^*$ are generated for the motor (26) corresponding to a value of the input torque command T*, a total command current $Is=[(Iq^*)^2+(Id^*)^2]^{1/2}$ is generated, a negative sequence current Ineg is calculated from sensed phase currents, where for three phases $Ineg=(\frac{1}{3})[Ia+(\alpha^2)Ib+(\alpha)Ic]$ with $\alpha=e^{j2\pi/3}$, Ineg and Is are combined to provide a normalized negative sequence current Inn=Ineg/Is, the normalized negative sequence current Inn is compared to a predetermined threshold value INN* to determine the presence of a phase current sensor (38) fault, and a control action is executed when Inn>INN*. The control action may include one or more of setting a fault flag, and/or setting a diagnostic code to indicate the nature of the fault, and/or reducing the phase drive voltage Vx and/or the phase drive current Ix to prevent damage to the motor and/or to other elements of the propulsion system supplying energy to the motor and/or providing a soft or hard shut-down to minimize risk to any personnel, material or processes associated with the propulsion system containing the motor. Embodiments of the invention may be retrofitted to existing propulsion systems.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Current sensor fault can lead to a significant gain/offset error among the current sensors that create three phase imbalance in sensed currents. The actual current in the phases can be much larger than the sensed currents in case of torque or current mode control. It is found that due to three phase imbalance in sensed currents, a negative sequence current arises that can be used to protect the system.

Figure 1:
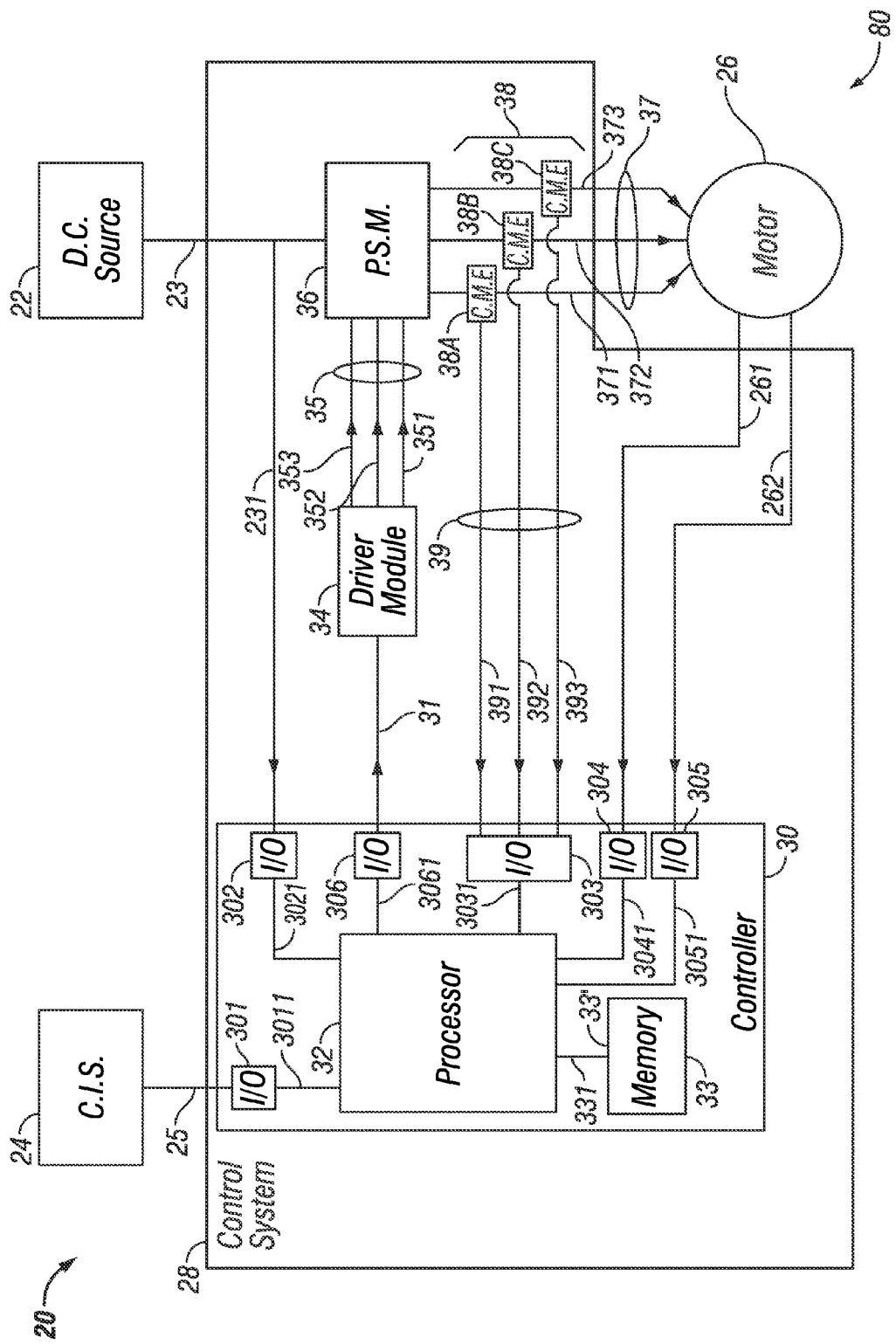
FIG. 1 illustrates a typical DC to AC motor propulsion system using elements known in the prior art combined with elements functioning according to embodiments of the invention illustrated in FIGS. 2 and 3.
Figure 2:
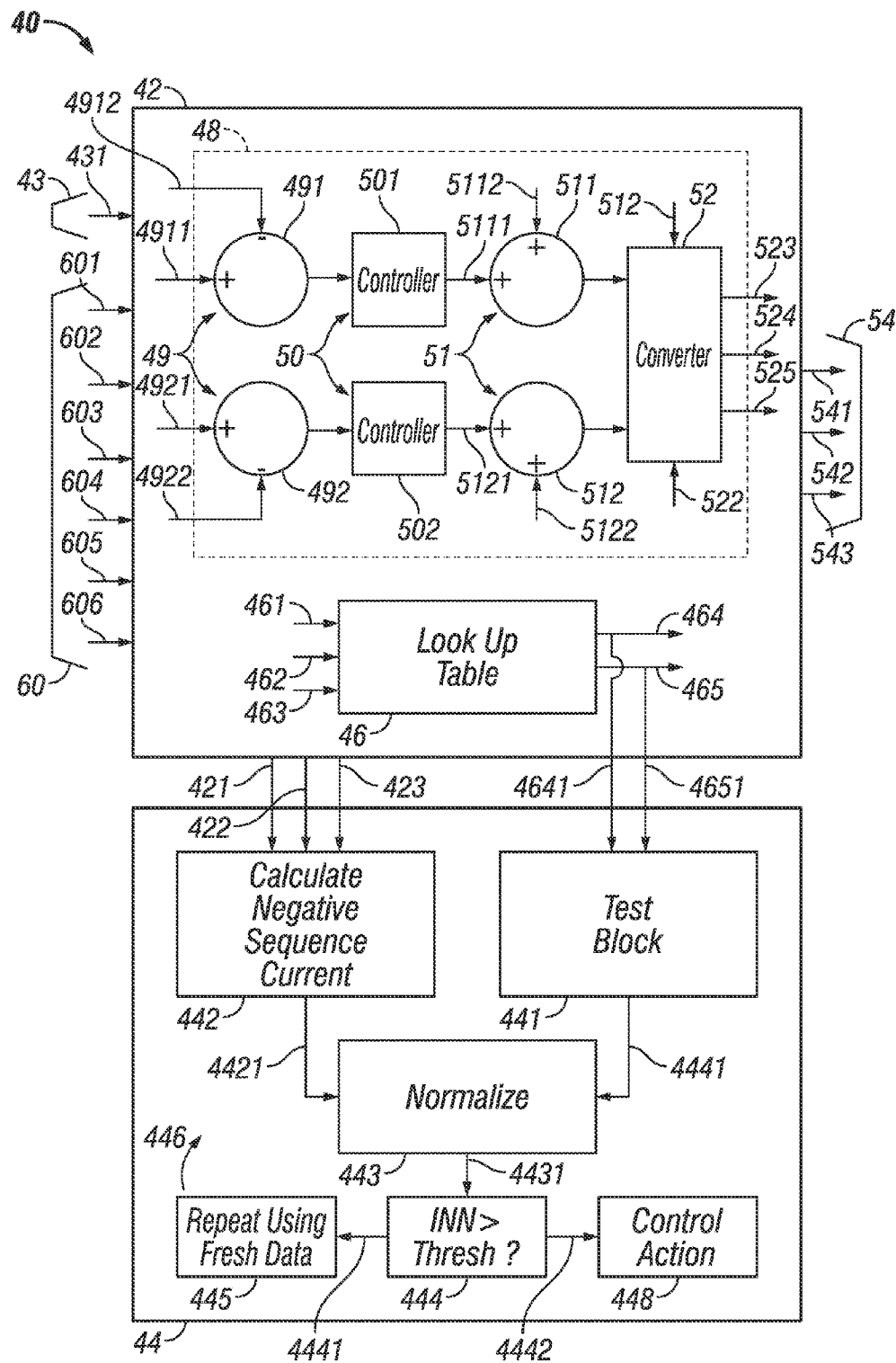
FIG. 2 shows a schematic functional diagram illustrating how a controller of FIG. 1 functions, including an algorithm for detecting a sensor error or failure in the propulsion system of FIG. 1, according to an embodiment of the invention.
Figure 3:
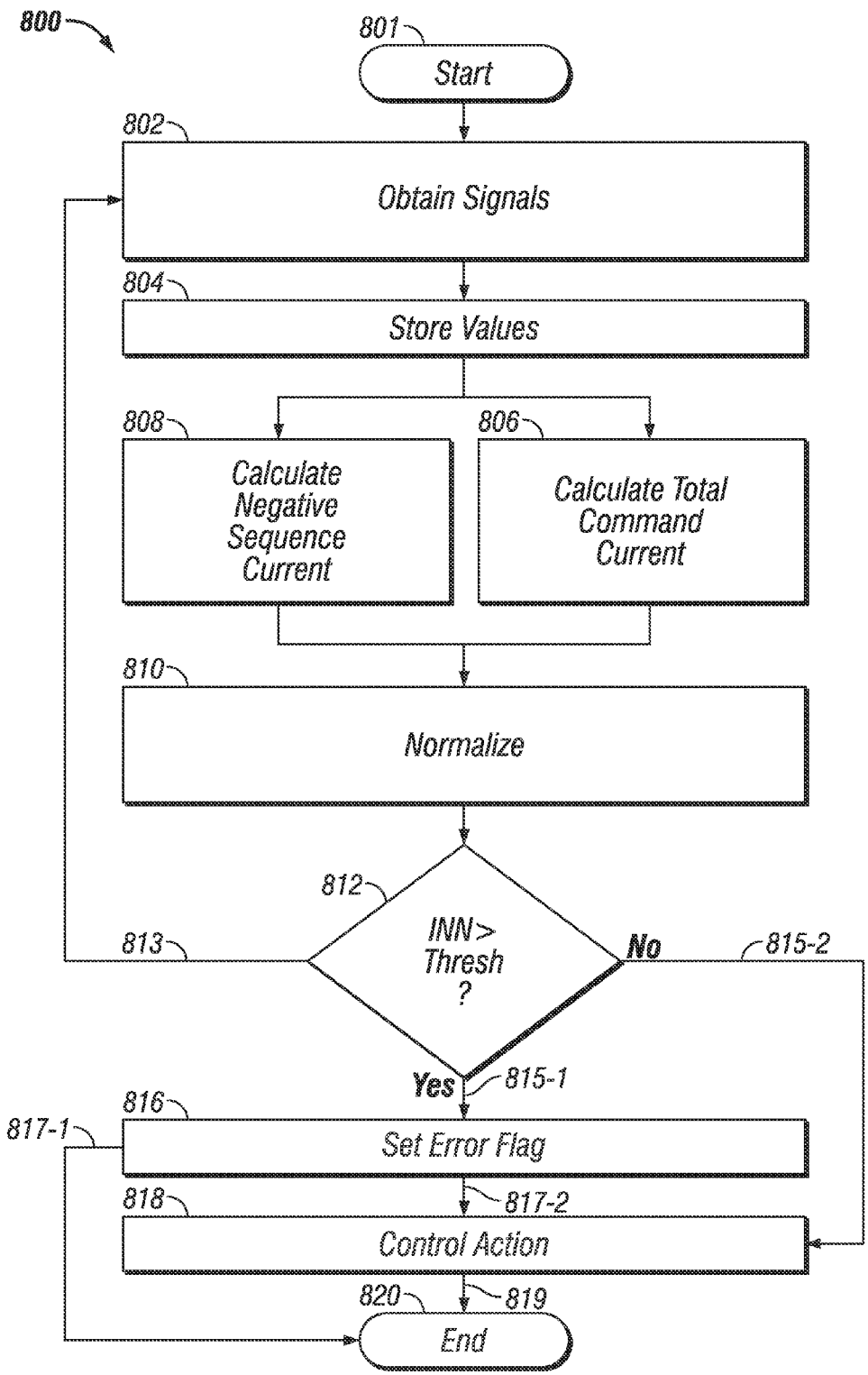
FIG. 3 is a flow chart illustrating a method for detecting a sensor failure or error in the propulsion system shown in FIGS. 1 and 2, and protecting the system from damage potentially arising from such error or failure, according to a further embodiment of the invention.

FIG. 1 illustrates typical DC to AC motor propulsion system 20, 80 using elements known in the prior art combined with elements functioning according to embodiments of the invention illustrated in FIGS. 2 and 3. When the system of FIG. 1 is carrying out the algorithm and method illustrated in FIGS. 2 and 3 according to embodiments of the invention, the system functions in a different manner and achieves results not found in the prior art. The convention is adopted of identifying as "system 20" the combination of prior art elements of FIG. 1 functioning according to the prior art, e.g., based on the contents of prior art memory 33, and identifying as "system 80" the combination of somewhat similar but re-programmed elements functioning differently, e.g., based on the contents of modified memory 33', that perform in the manner illustrated in FIGS. 2 and 3 according to embodiments of the present invention. Those elements common to propulsions systems 20, 80 are discussed together. Propulsion system 20, 80 includes DC source 22, command input source 24, electric motor 26 and control system 28. Control system 28 receives: (i) DC energy Vdc via links 23, 231 from DC source 22, e.g., a battery, and (ii) command inputs (e.g., commanded torque T*) via link 25 from command input source 24 and provides power to control the operation of motor 26. User specified command inputs entered in command source input 24 tell propulsion system 20, 80 what to do, i.e., how motor 26 should behave.

Control system 28 converts the DC energy received from DC source 22 to AC energy in response to the input command(s) received from input command source 24 and delivers AC energy of appropriate phase and magnitude via links 37 to motor 26. For convenience of explanation, it is assumed that motor 26 is a three-phase motor having motor phases A, B, C, but other AC motors with more or fewer phases may also be used in connection with system 80. Control system 28 includes controller 30, driver module 34, power switching module 36 and current measuring elements 38A, 38B, 38C (collectively 38) for phases A, B, and C respectively of motor 26. Driver module 34 is conventional. Driver module 34 receives via bus 31 the phase control signals generated by controller 30, and provides whatever level shifting may be necessary to convert such drive control signals to a level suitable for use by power switching module 36 to which they are sent via links 35, e.g., 351 for phase A, link 352 for phase B and link 353 for phase C. Such phase control signals are also referred to as pulse width modulation (PWM) signals. For a three-phase motor, power switching module 36 typically includes six power switching devices (e.g. 2 for each phase) that switch phases A, B, C between the local reference voltage (e.g., the motor neutral) and Vdc provided by DC source 23 at appropriate times determined by the PWM signals received from driver module 34. Power switching module 36 provides pulsed phase voltages Va, Vb, Vc on motor phases A, B, C respectively, e.g., phase voltage Va for motor phase A on link 371, phase voltage Vb for motor phase B on link 472 and phase voltage Vc for motor phase C on link 373. Such power switching modules are well known in the art.

Depending upon the type of propulsion or drive system that is needed, command input(s) from interface 24 via link 25 may include inputs specifying, for example and not intended to be limiting, the torque T* desired to be provided by motor 26, or the speed of rotation ωr* of motor 26 in revolutions or radians per unit time desired to be provided by motor 26 or some other parameter of importance to the use of propulsion system 20, 80. For convenience of explanation and not intended to be limiting, it is assumed hereafter that command input source 24 is providing a desired torque command T* to propulsion system 20, 80. For convenience of description, an asterisk is appended to parameters or variables to indicate that such variable or parameter is a commanded or reference value as opposed to an actual or measured value. For example, the variable or parameter T* is intended to indicate a desired or commanded torque value while the variable or parameter T without such asterisk is intended to indicate an actual torque value. Similarly, ωr* refers to a commanded rotor speed and ωr refers to a corresponding actual rotor speed of motor 26. This convention is followed throughout.

Current sensors 38A, 38B, 38C (collectively 38) measure the currents Ia, Ib, Ic (collectively Ix) flowing, respectively, to phases A, B, C of motor 26 from DC source 22 via power switching module 36 and links 37. Signals representing these measured values are fed via links 39 to controller 30, e.g., a measured value representing Ia on link 391, a measured value representing Ib on link 392 and a measured value representing Ic on link 393. However, persons of skill in the art will understand they are not the real currents flowing in links 39 to controller 30 but are merely signals indicative of the magnitude of the real currents Ia, Ib, Ic actually flowing through links 37 to motor 26. The term Ix is used to refer to phase currents and the term Vx is used to refer to phase voltages generally or collectively (and signals representative of such phase currents or voltages), where x takes on values appropriate for the number of motor phases being employed. For example, for a 2-phase machine x would take on two values (e.g., a, b) for a 3-phase machine three values (e.g., a, b, c), for a 6-phase machine six values, and so forth.

Controller 30 has input/output interface (I/O) units 301-306, processor 32 and memory 33, 33'. Memory 33 is intended to refer to the memory controlling the operation of system 20 operating according to the prior art and memory 33' is intended to refer to the memory controlling the operation of system 80 operating according to FIGS. 2-3. Processor 32 may be a single processor, a multi-core processor or several quasi-independent processors sharing the computational load of controller 30. I/O interface units 301-306 communicate with processor 32 via links or busses 3011, 3021, 3031, 3041, 3051, and 3061, respectively. Input interface unit 301 receives, for example, T* input from command input source 24 via link or bus 25. Input interface unit 302 receives Vdc from DC source 22 via links or buses 23 and 231. Input interface unit 302 receives the signals representing Ia, Ib, and Ic from current sensors 38A, 38B, 38C, respectively over links or buses 39. Input interface unit 304 receives rotor angle information θr from motor 26 via link or bus 261. Input interface unit 305 receives rotor speed information ωr from motor 26 via link or bus 262. Input interface units 301-305 provide whatever level shifting or other signal manipulation may be needed to make such information compatible with processor 32. Output interface unit 306 receives motor phase actuation signals from processor 32 via link or bus 3061 and provides whatever level shifting or other signal manipulation that may be required to make such instructions useful to driver module 34 via link or bus 31. Memory 33, 33' and processor 32 are coupled by link or bus 331. For convenience of explanation, processor 32 and memory 33, 33' are shown in FIG. 1 as being separate elements coupled by link 331 but may be combined in other embodiments. Either arrangement is useful. In an embodiment of the invention, controller 30 receives feedback information concerning Vdc, Ia, Ib, Ic, θr, and ωr, combines this information with information concerning the properties of propulsion system 80 stored in memory 33', and using algorithms described in connection with FIGS. 2-3 also conveniently stored in memory 33', detects whether or not a sensor error or failure has occurred and takes appropriate action to alert the system user and/or protect propulsion system 80 from damage. While most of the individual elements of propulsion system 20, 80 depicted in FIG. 1 may be old in the art, the combination of such elements with the algorithms described in connection with FIGS. 2-3 and, for example, stored in memory 33' or elsewhere, provides new and improved system 80 and method 800 capable of detecting sensor faults and taking remedial action.

FIG. 2 shows schematic 40 with controller functional diagram 42 and algorithm 44. Functional diagram 42 illustrates how controller 30 of FIG. 1 generates the signals that appear on bus or link 31 to driver module 34 and ultimately enable power switching module 36 to supply voltages Va, Vb, Vc and currents Ia, Ib, Ic to phases A, B, C of motor 26 of FIG. 1. Algorithm 44 enables controller 30 to detect current sensor error or failure in propulsion system 80 of FIG. 1 and take remedial action.

A multi-phase electric motor may be mathematically represented as having two axes of magnetic symmetry, i.e., a direct axis (d) and a quadrature axis (q), as will be understood by those of ordinary skill in the art. The operation of such multiphase electrical motor may be represented by corresponding direct axis current Id*, Id adapted to provide a direct axis stator flux $\psi_d^*$, $\psi_d$ and quadrature current Iq*, Iq adapted to provide a quadrature stator flux $\psi_q^*$, $\psi_q$, where as before, the presence of an * indicates a commanded quantity and the absence of the * indicates an actual or measured quantity, where Id and Iq are represented, for example, by the equations:

$$Id = (2/3)[(Ia)(\cos\theta r) + (Ib)(\cos(\theta r - 2\pi/3)) + (Ic)(\cos(\theta r + 2\pi/3))], \text{ and} \quad \text{Eq. 1}$$

$$Iq=(2/3)[(Ia)(\sin\theta r)+(Ib)(\sin(\theta r-2\pi/3))+(Ic)(\sin(\theta r+2\pi/3))], \quad \text{Eq. 2}$$

where θr is the rotor angle. If actual or measured currents Ia, Ib, Ic and rotor angles θr are used the results provide Id and Iq (i.e., without *) and if commanded currents Ia*, Ib*, Ic* and rotor angles θr are used the results provide Id* and Iq*. In practice, the physical relationship between T, Vdc, ωr and Ia, Ib and Ic are experimentally determined, Id and Iq calculated and placed, for example, in a look-up table or equivalent in memory, e.g., memory 33, 33' of FIG. 1. Then, as indicated in block 46 of FIG. 2, for any given combination of input command 43 (e.g., T*), Vdc and ωr, then Id* and Iq* can be determined from the look-up table.

Functional diagram 42 includes portion 48 having: (i) combiners 491, 492 (collectively 49) receiving input Iq* on lead, input Iq on lead 4912, input Id* on lead 4921 and input Id on lead 4922, (ii) proportional integral (PI) controllers 501, 502 (collectively 50) coupled to the outputs of combiners 49 respectively, (iii) combiners 511, 512 (collectively 51) receiving the outputs of PI controllers 50 on leads 5111 and 5121, and input $\{(\omega r)(\psi_d^*)+(Iq^*)(Rs)\}$ on lead 5112 and input $\{-(\omega r)(\psi_q^*)+(Id^*)(Rs)\}$ on lead 5122, where Rs is the stator resistance of motor 26, and (iv) d, q to a, b, c converter 52 receiving the outputs of combiners 511, 512, input ωr on lead 521 and input θr on input 522, and yielding signal Va* on output 523, signal Vb* on output 524 and signal Vc* on output 525 resulting in signals on link or bus 31 (see FIG. 1) sufficient to generate Va, Vb, Vc on links 37 at the output of power switching module 36 to supply Ia, Ib, Ib to phases A, B, C of motor 26. Stated another way portion 42 of controller 30 provides pulse width modulation (PWM) signal Da on output 541, signal Db on output 542, and signal Dc on output 543 (collectively 54) which when fed through driver module 34 to power switching module 36 of FIG. 1 generate Va, Vb, Vc on phases A, B, C of motor 26.

Feedback signals 60 to controller 30 may include the phase current signal Ia on input 601, phase current signal Ib on input 602, phase current signal Ic on input 603, voltage Vdc of DC voltage source 22 of FIG. 1 on input 604, measured rotor speed $\omega_r$ on input 605 and measured rotor $\theta_r$ on input 606. Other signals processed by controller 30 may therefore include a direct axis stator flux $(\psi_d^*)$ and a quadrature stator flux $(\psi_q^*)$ of motor 26 of FIG. 1, as well as a stator resistance $(R_s)$ thereof, which values may be stored in memory 33, 33' of FIG. 1 or readily calculated by processor 32 based upon data concerning motor 26 stored in memory 33, 33'. As illustrated by portion 48 of schematic diagram 40, controller 30 is adapted for processing signals 43 and 60 to generate phase voltages Va, Vb, and Vc for control of electric motor 26.

Controller 30 also uses other conventional AC motor control variables. As will be well understood by those of ordinary skill in the art, voltages and currents may be represented as vectors on the d-q coordinate system. Controller 30 is therefore adapted for determining a current command value Id*, Iq* i.e., a current supplied to the respective d-axis and q-axis, and a voltage command value Vd*, Vq* i.e., a voltage value applied to the respective d-axis and q-axis, based on the torque command signal (e.g., T*) 43 on input 431 and data concerning motor 26 stored in memory 33, 33'. Block 46 of diagram 42 indicates that by receiving T* on input 461 thereto, receiving Vdc on input 462 thereto and receiving $\omega_r$ on input 463 thereto, that such variables are used in conjunction with a look-up table to provide Iq* on output 464 of block 46 and Id* on output 465 of block 46, which are communicated by links 4641, 4651 respectively, to block 441 of portion 44. Similarly, Ia is communicated via link 421, Ib via link 422 and Ic via link 423 to block 442 of portion 44. Although not shown in FIGS. 1 and 2 for simplicity, those of ordinary skill in the art will understand that various means exist for detecting or measuring the d-q voltage and current values, including the use of resolvers, current sensors, voltage sensors, etc. Controller 30 ultimately outputs a set of pulse-width modulation (PWM) signals 54 (e.g., Da on output 541, Db on output 542, and Dc on output 543) through interface 306 to driver module 34 and power switching module 36 for speed and torque control of motor 26.

A current sensor fault detection algorithm, according to the present invention, is illustrated schematically in portion 44 of FIG. 2 wherein phase currents Ia, Ib, Ic are transferred via links 421, 422, 423 respectively, and direct and quadrature command currents Id* and Iq* are transferred via links 4641, 4651 respectively from portion 42 to algorithm 44. FIG. 3 is a flow chart illustrating method 800 for detecting a failure or error in current sensors 38 in propulsion system 80 shown in FIG. 1 and protecting system 80 from potential damage arising from such sensor error or failure. Portion 44 and FIG. 3 are discussed together. Method 800 begins with start 801 and initial step 802 wherein signals for indicated phase currents Ix and command currents Iq* and Id* are obtained. This is accomplished by controller 30 of FIG. 1 or portion 42 of FIG. 2 receives: (i) signals corresponding to signal outputs Ix (e.g., Ia, Ib, Ic) of current sensors 38 e.g., 38A, 38B, 38C) of FIG. 1 respectively, (ii) signals corresponding to torque command T* 43 from command input source 24, Vdc from DC source 22, (iii) rotor speed signal ωr from motor 26 or other motor speed source, and (iv) rotor angle signal θr from motor 26 or other rotor angle source. Signals corresponding to quadrature and direct command currents Iq* and Id* are generated within controller 30, for example and not intended to be limiting, by extracting them from a look-up table in memory 33' as indicated by block 46 of FIG. 2. In method stage 804, the above noted values are stored, e.g., in memory 33' or in any other memory accessible to propulsion system 80.

In method step 806 of FIG. 3 and in block 441 of FIG. 2, the total command current Is=f(Iq*,Id*) is calculated according to the following equation, $$Is=[(Iq^*)^2+(Id^*)^2]^{1/2}, \quad \text{Eq. 3}$$

and the result Is appears Ion output 4411 of block 441 and is desirably stored in memory, e.g., memory 33' of FIG. 1. In method step 808 of FIG. 3 and block 442 of FIG. 2, the negative sequence current Ineg=f(Ix) is calculated, in the case of a three phase system, according to the following equation:

$$Ineg=(1/3)[Ia+(\alpha^2)Ib+(\alpha)Ic], \text{ where } \alpha=e^{j2\pi/3}, \quad \text{Eq. 4}$$

and Ineg appears on output 4421 and is desirably stored in memory, e.g., memory 33' of FIG. 1. When there is a significant sensor error, a negative sequence current Ineg is created due to imbalanced three phase currents. Steps 806 and 808 and blocks 441, 442 may be performed in either order or substantially in parallel depending upon the number of processors available.

In method step 810 of FIG. 3 and block 443 of FIG. 2, Ineg is normalized, that is, normalized negative current Inn is calculated, according to the equation:

$$Inn=Ineg/Is. \quad \text{Eq. 5}$$

and appears on output 4431 of block 443. Query step 812 of FIG. 3 or "test" block 444 of FIG. 2 is then executed, wherein it is determined whether or not Inn is greater than a predetermined threshold value INN* stored in memory, e.g., memory 33' of FIG. 1. When there is no significant sensor error, Inn is near zero. If the outcome of the query Inn>INN* is "NO", indicating that there is no significant sensor error, then method 800 loops back as indicated in FIG. 3 for example, along path 813 to repeat steps 802-810 for updated data. Or, as illustrated in FIG. 2, a NO indication appears on output 4441 of test block 444 to "repeat" block 445 of FIG. 2, and arrow 446 from block 445 of FIG. 2 indicates that blocks 441-444 are repeated using fresh data. INN* is desirably chosen to take into account the manufacturing tolerances associated with current sensors 38. For example, if sensors 38 are known to have an individual error range of approximately +/−7%, then INN* is desirably chosen to accommodate somewhat larger sensor errors, perhaps providing 10-15% latitude. If errors in more than one sensor need to be tolerated, then INN* may be set to several times the individual sensor error range, perhaps providing 25-30% latitude. As long as Inn≤INN*, then the outcome of query 812 and test block 444 remain "NO" and loop-back 802-812-813-802, etc., and 441-444, etc., continue.

If the outcome of query 812 is "YES" indicating that a significant sensor error has been detected, then method 800 may advance along path 815-1 to step 816 where a fault or error flag is set in memory, e.g., memory 33'. Method 800 may then advance along path 817-1 to END 820. In a further embodiment, method 800 may advance from a "YES" outcome of query 812 along path 815-2 to step 818 wherein a control action is executed, for example to reduce Ia, Ib, Ic to preclude damage to power switching module 36 and/or motor 26 or for other reasons, and then along path 819 to END 820. In a still further embodiment, method 800 may advance via path 815-1 to step 816 wherein the error or fault flag is set and then advance along path 817-2 to step 818 where the control action is executed and then along path 819 to END 820. Any of the foregoing is useful. Such actions are also indicated in FIG. 2, when a "YES" outcome appears on output 4442 of test block 44 to block 448, block 448 illustrates the outcome "if YES, set fault flag and/or execute control action".

Setting the error fault flag in memory is useful in protecting propulsion system 80 and/or the operators of system 80 whether or not step 18 immediately follows to switch OFF system 80 or reduce the current drive instructions being provided to power switching module (PSM) 36 and the resulting phase current Ia, Ib, Ic to motor 26. If the value of INN* is set below the levels of phase current Ia, Ib, Ic that might cause damage to PSM 36 or motor 26, then operation of system 80 may continue, for example, while controller 30 checks for further changes in Inn, or while a warning light, horn or other alarm signal is fed back to the system operator, for example, by posting an alert proximate command input source 24. This approach is particularly useful when an unheralded shut-down (e.g., turn-OFF) of system 80 might in itself pose risks to persons or equipment or processes associated with system 80. Thus, algorithm 44 and method 800 can accommodate a wide variety of fail-safe shut-down or slow-down or fail-soft protocols that preclude or minimize damage to sensitive parts of system 80, for example and not limited to just PSM 36 and motor 26, while still accommodating the safety needs of personnel, or products or materials associated with propulsion system 80. For example, if propulsion system 80 is associated with a vehicle, method 800 can set a fault flag that warns the vehicle operator that a sensor failure has occurred and if such failure is large or persists, advise the operator to immediately take action to reach a safe stopping place. In another example, where the propulsion system is, for example, driving a circulating pump cooling hazardous material, the control action may involve actuating back-up cooling systems or allowing continuing operation at the same or a reduced level to permit a manual shut-down to be effected or operating personnel to safely leave the area.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for detecting a phase current sensor fault in a multi-phase electrical machine, the method comprising:
   receiving an input torque command T* and measuring a set of feedback signals of the electrical machine including a phase current Ix for each phase thereof;
   generating direct and quadrature command phase currents Id*, Iq* for the machine corresponding to the value of an input torque command T*;
   determining a total command current Is=f(Id*, Iq*);
   generating a negative sequence current Ineg =f(Ix);
   combining Ineg and Is to provide a normalized negative sequence current Inn=Ineg/Is;
   comparing the normalized negative sequence current Inn to a predetermined threshold value INN* to determine the presence of a phase current sensor fault; and
   executing a control action when Inn>INN*, wherein the control action comprises reducing the phase currents Ix flowing to the machine or reducing a phase voltages Vx applied to the machine.

2. The method of claim 1, wherein the control action includes setting a fault flag when Inn>INN*.

3. The method of claim 2, wherein the control action includes setting a diagnostic code indicating the nature of the fault.

4. A method for detecting a phase current sensor fault in a three-phase electrical motor, the method being executable via a motor controller adapted for controlling the electric motor, and comprising:
   measuring an input torque command T* and set of feedback signals of the electrical motor including a phase current Ia, Ib, Ic for each of the three phases of the electric motor, and using the controller;
   generating direct and quadrature command phase currents Id*, Iq* for the motor corresponding to a value of the input torque command T*;
   determining a total command current Is $=[(Iq*)^2+(Id*)^2]^{1/2}$;
   generating a negative sequence current Ineg $=(1/3)[Ia+(\alpha^2)Ib+(\alpha)Ic]$, where $\alpha=e^{j2\pi/3}$, and wherein (i) "e" is a mathematical constant named Euler's number, with the natural logarithm of "e" being equal to one, (ii) "j" represents an imaginary number equal to the square root of negative one, and (iii) "π" is the ratio of the circumference of any circle to the diameter of that circle;
   combining Ineg and Is to provide a normalized negative sequence current Inn =Ineg/Is;
   comparing the normalized negative sequence current Inn to a predetermined threshold value INN* to determine the presence of a phase current sensor fault; and
   executing a control action when Inn>INN*, wherein the control action comprises reducing one or more of the phase currents flowing to the motor or reducing voltages Va, Vb, Vc applied to the motor.

5. The method of claim 4, further comprising, setting a fault flag when Inn>INN*.

6. The method of claim 5, further comprising, also setting a diagnostic code indicating the nature of the fault.

7. A method for protecting an electric propulsion system from malfunction of one or more current sensors that measure phase currents into windings Wa, Wb, Wc of a drive motor, the current sensors providing indicated motor phase current signals Ia, Ib, Ic, the method comprising:
    receiving from the current sensors indicated motor phase current signals Ia, Ib, Ic;
    receiving a motor torque command T* from a command input source;
    receiving a motor rotation speed ωr from the motor;
    receiving a direct current (dc) voltage Vdc from a dc source supplying the drive currents to the motor windings Wa, Wb, Wc;
    using T*, ωr, and Vdc, obtaining values for time varying direct axis command current Id* and quadrature axis command current Iq*;
    determining values for total command current Is =((Id*)$^2$+(Iq*)$^2$)$^{1/2}$;
    determining values for negative current In =($\frac{1}{3}$)*(Ia+α$^2$Ib+αIc) where α=e$^{j2\pi/3}$, and wherein (i) "e" is a mathematical constant named Euler's number, with the natural logarithm of "e" being equal to one, (ii) "j" represents an imaginary number equal to the square root of negative one, and (iii) "π" is the ratio of the circumference of any circle to the diameter of that circle;
    determining values for normalized negative current Inn=In/Is; and
    comparing Inn to a predetermined threshold value INN*, and if Inn>INN*, executing a control action*, wherein the control action comprises setting an error flag or an error diagnostic code in memory.

8. The method of claim 7, further comprising, if Inn>(INN*), reducing the drive current flowing to the motor windings Wa, Wb, Wc.

9. The method of claim 8, wherein the drive current flowing to the motor windings Wa, Wb, Wc is obtained from the dc voltage source by converting the voltage Vdc into three time varying voltages Va, Vb, Vc of different phases A, B, C each applied to a respective winding Wa, Wb, Wc of the motor, and wherein the drive currents flowing to the motor windings Wa, Wb, Wc are reduced by reducing Va, Vb, Vc.

10. The method of claim 9, wherein the three time varying voltages Va, Vb, Vc of different phases A, B, C, each applied to a respective motor winding Wa, Wb, Wc depend upon the torque command T*, and if Inn>(INN*), overriding T* to reduce Va, Vb, Vc.

11. The method of claim 10, wherein the torque command T* is derived at least in part from an operator actuated throttle position.

12. The method of claim 7, further comprising, when Inn>INN*, setting a fault flag or indicator and then reducing the phase voltages Va, Vb, Vc.

13. The method of claim 7, further comprising, when Inn>INN*, reducing one or more phase currents into windings Wa, Wb, Wc.

14. The method of claim 7, further comprising, when Inn>INN*, turning off the drive motor.

* * * * *